June 4, 1968

E. J. SWEARINGEN 3,386,758

AIRCRAFT LATCH ASSEMBLY

Filed Aug. 30, 1967

INVENTOR
EDWARD J. SWEARINGEN

BY
ATTORNEYS

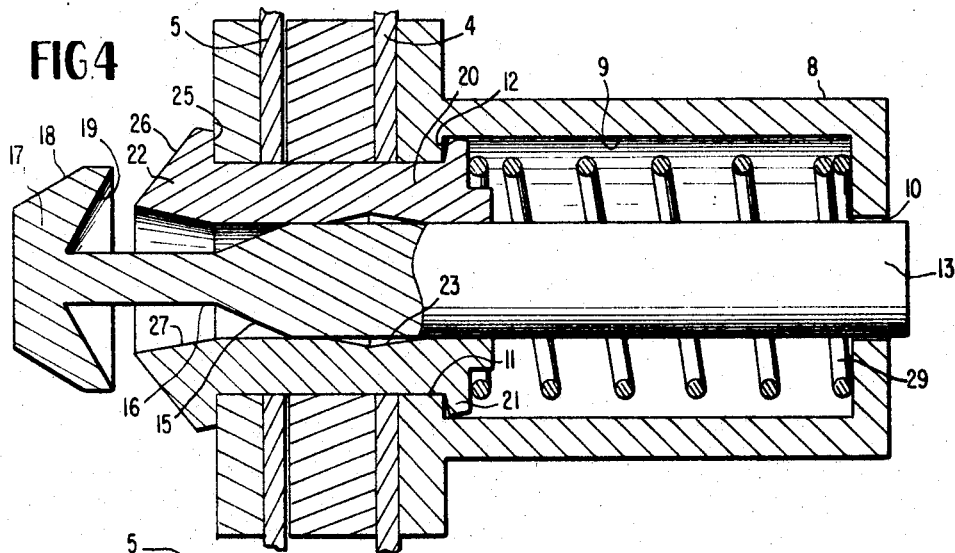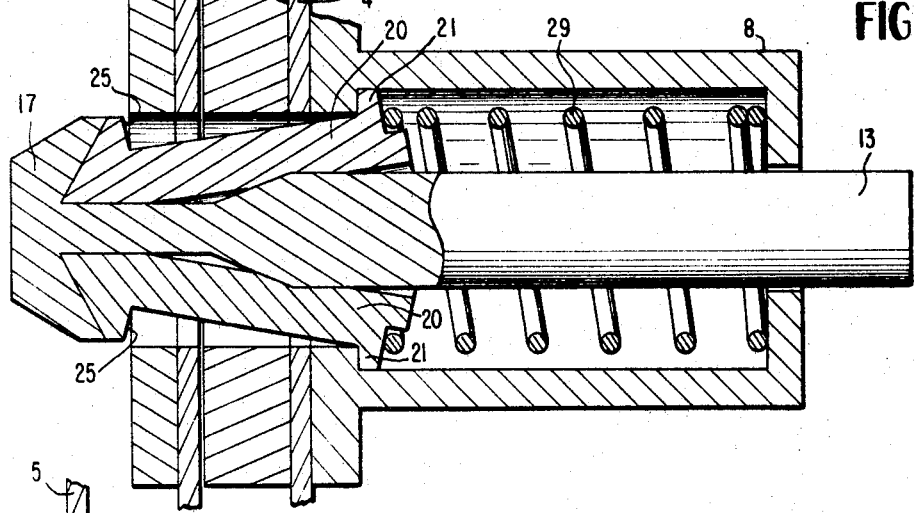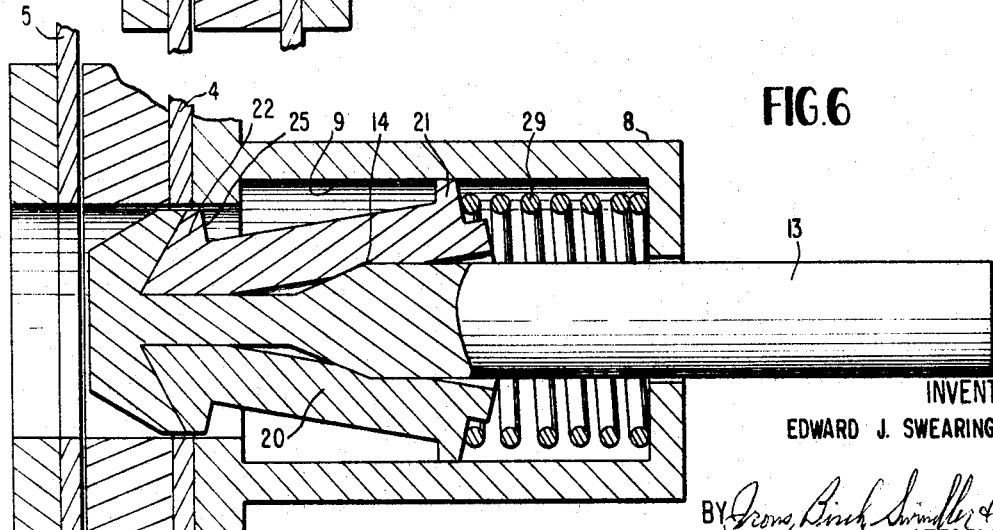

June 4, 1968  E. J. SWEARINGEN  3,386,758
AIRCRAFT LATCH ASSEMBLY
Filed Aug. 30, 1967  3 Sheets-Sheet 3

United States Patent Office 3,386,758
Patented June 4, 1968

3,386,758
AIRCRAFT LATCH ASSEMBLY
Edward J. Swearingen, San Antonio, Tex., assignor to Swearingen Aircraft, a general partnership of Swearingen Aircraft, Inc., San Antonio, Tex., a corporation of Delaware
Continuation-in-part of application Ser. No. 432,212, Feb. 12, 1965. This application Aug. 30, 1967, Ser. No. 667,040
7 Claims. (Cl. 292—53)

ABSTRACT OF THE DISCLOSURE

A bayonet latch assembly with a slidably mounted operating pin surrounded by a number of segments. The segments nest against the operating pin so that when it is moved forward the segments are urged forwardly to their fully extended position where they are cammed by the operating pin in a radially outward fashion to engage the periphery of a receiving opening in the opposed structure. The assembly also may include a retainer to prevent the segments from moving radially outwardly until they are fully extended.

Related application

This application is a continuation-in-part of application Ser. No. 432,212, filed Feb. 12, 1965.

This invention is directed generally to the art of latch assemblies and more specifically to an improved latch assembly for uniting an aircraft opening closure to the aircraft frame or fuselage.

A major problem in aircraft construction is that of obtaining effective union between an aircraft opening closure, such as an access door or equipment hatch, and the aircraft frame or fuselage in such a manner that sufficient strength is present in the union to permit safe operation of the aircraft and also to allow the cabin of the aircraft to be operated under pressurized conditions. Generally the unions have been of such nature that heavy reinforcing structure is required around the aircraft opening with the opening closure carrying little load across the opening.

The latch of the present invention presents an outstanding improvement over the prior art in that it provides excellent stability for the aircraft fuselage with high shear, compression and tensile strength across the joint between the closure member and aircraft frame. Thus, by utilization of the hereinafter disclosed latch essentially uninterrupted shear, compression and tensile strength throughout the aircraft fuselage can be obtained since the closure member actually becomes a structural member of the aircraft when the latch is engaged to fix the closure in closed relation to the opening.

The latch of the present invention is also an improvement over the art, in that, in the event of a crash landing wherein the frame for the opening is knocked out of line, the latch will still be retractable and allow removal of the closure from the opening.

In the drawings,

FIGURE 4 is a horizontal sectional view showing the latch in its operative or engaged position.

FIGURE 5 is a horizontal sectional view showing the latch in an intermediate state ready for retraction and disengagement.

FIGURE 6 is a horizontal sectional view of the latch showing the latch in its retracted position.

Generally speaking, the present invention encompasses a latch means for an aircraft closure comprising a housing, an operating pin slidably positioned within the housing, a plurality of plunger segments positioned around the operating pin, each of the plunger segments having a forward enlarged shoulder and a rearward flange, the plunger segments being moved outwardly and inwardly relative to the pin axis dependent upon the direction of axial movement of the operating pin, and means for producing positive forward and rearward movement to the operating pin.

Figure 1:
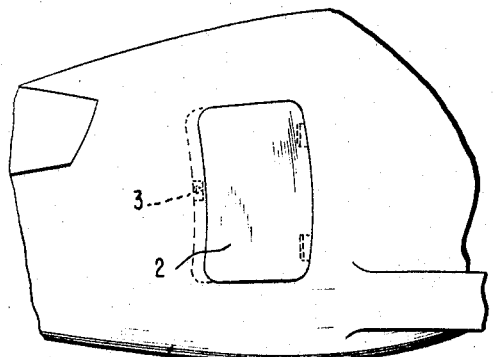
FIGURE 1 represents a portion of an aircraft fuselage showing a closure or access door that is equipped with a latch means of the present invention.

Referring to FIGURE 1, the latch 3 is shown in an appropriate position for uniting the closure 2 to the aircraft structure 1. This illustration, however, is only one example of employing the latch since any number of latches could be mounted around the periphery of the closure where it is in the form of an access door or equipment hatch. Furthermore, the closure 2 is not restricted to a door, but also encompasses equipment hatches and any closure for an opening in the aircraft fuselage, wings, tail, etc. As shown in FIGURES 2, 4, 5, and 6, the two co-acting components of the latch are mounted on the cooperating parts of the closure and frame surrounding the aircraft opening. These parts are identified by the numerals 4 and 5, it being understood that either part 4 or 5 may identify a portion of the closure while the other numeral identifies the frame surrounding the aircraft opening.

Figure 2:
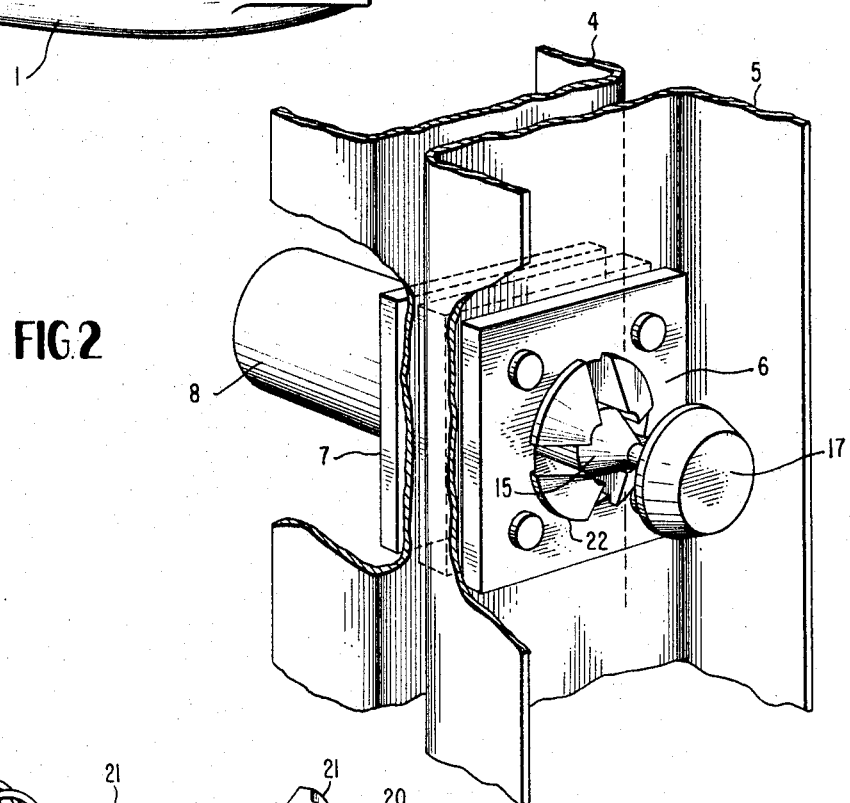
FIGURE 2 shows a cut away portion of the aircraft structure and closure to illustrate the latch in its operative position.
Figure 3:
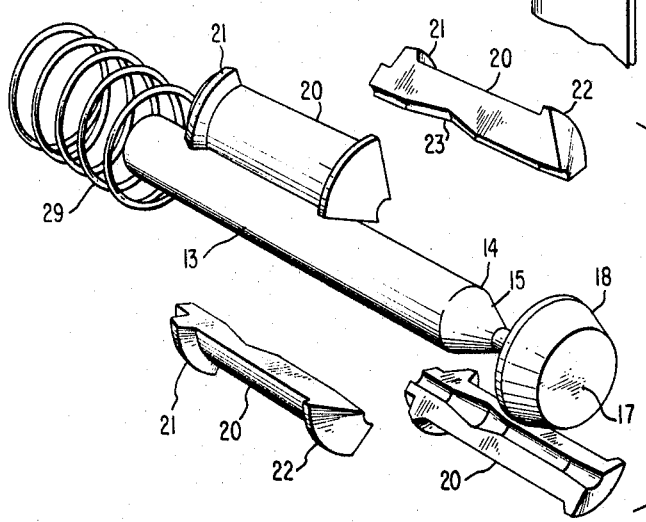
FIGURE 3 is a view setting forth the operative parts of the latch in a disassembled arrangement.

Referring to FIGURES 2 and 3, it is seen that a latch housing 8 is affixed to the part 4. As may be seen in the first embodiment of the invention shown in FIGURE 4, the housing 8 has an aperture 10 at its rearward end and an aperture 11 at its forward end through which an operating pin 13 protrudes. The parts 4 and 5 have cylindrical apertures corresponding in diameter to aperture 11 with the three apertures being aligned as shown in FIGURES 4, 5 and 6 when the closure is positioned to be united with the aircraft opening frame. The operating pin 13 is thus slidably positioned within the latch housing and is partially surrounded along its length by a suitable coil spring 29. Any suitable handle means (not shown) may be provided on one or both ends of the operating pin 13 to facilitate moving the pin axially to engage and disengage the latch. Also partially positioned within the housing 8 are a plurality of plunger segments 20, four being shown in the latch as illustrated. However, any number of plunger segments may be provided around the periphery of the operating pin 13.

The plunger segments 20 are restricted from removal from within housing 8 by means of the spring 29 engaging flanges 21 on segments 20 which extend radially beyond the periphery of the forward aperture 11 of housing 8. Flanges 21 engage the shoulder 12 at the forward end of housing 8 when biased to forward position by spring 29. It may be seen from FIGURES 4, 5 and 6 that the spring 29 at all times is in engagement with the spring engaging flanges 21 of the plunger segments 20 and thus continually urge plunger segments 20 into their forward positions whereat they extend through the aligned apertures in parts 4 and 5 and aperture 11 as shown in FIGURES 4 and 5. The forward end of each plunger segment 20 terminates in an enlarged shoulder portion 22. This shoulder portion 22 has a beveled outer end surface 26, the purpose of which will be hereinafter described, and a tapered inner surface 27 the purpose of which will likewise hereinafter be described. In addition, the inner surface of each segment 20 has an indentation 23 designed to mate with the exterior of pin 13 in the relative positions of pin 13 and segments 20 as shown on FIGURES 5 and 6.

The operating pin 13 has a conically tapered portion 15 intermediate a cylindrical section which mates with aperture 10 in housing 8 and a reduced diameter section 16. Forwardly of the reduced diameter section 16 the pin 13 has a terminal head portion 17. The head portion 17 of the operating pin 13 has a beveled forward surface 18 and a conically concave rearward surface 19, the purpose of which will be hereinafter described. The rearward end of the operating pin 13 extends from within the housing 8 and is to be operated by any suitable positive actuating means or by a handle means (not shown). It has been set forth above that a plurality of latches made in accordance with the present invention could be provided around the periphery of the closure. A single actuating device may be employed to operate all of the latches simultaneously.

In operation, the latch of the present invention functions as follows:

When the closure member 2 is in closed position relative to the aircraft opening, the parts 4 and 5 are in abutting relationship such as shown in FIGURES 2, 4, 5 and 6. In the retracted position of pin 13 as seen in FIGURE 6, the operating pin 13 extends rearwardly from the housing 8 and the plunger segments 20 are withdrawn by the pin from the aperture in part 5. Actuation of the operating pin, by the handle means or other suitable operator (not shown) produces a forward motion to the pin and permits the plunger segments 20 to move forward under the influence of spring 29 to the relative positions as seen in FIGURE 5. In this state, the head portion 17 of the pin 13 and enlarged shoulder portions 22 of the plunger segments 20 project through the aperture in part 5. It will be noted from FIGURE 6 that the beveled portions 26 of the shoulder portions 22 of the plunger segments 20 are nestingly engaged with the conically concave surface 19 of the operating pin 13. Thus, the concave surface 19 holds the segments 20 in against the reduced diameter section 16 while the portion 14 of the pin is nested in the identations 23 in segments 20. It will also be appreciated that in withdrawing pin 13 to disengage the latch from its position shown in FIGURE 4, the concave surface 19 will engage with the beveled portions 26 on segments 20 and cam the forward ends of segments 20 inwardly to the relationship shown in FIGURES 5 and 6.

As the operating pin 13 moves forward, the plunger segments 20 are stopped by flanges 21 contacting the end wall 12 of housing 8. At this point the forward enlarged shoulders 22 of the plunger segments project beyond the aperture of the part 5 and these segments are pivoted outwardly by the forward movement of the beveled portion 15 of the operating pin 13 while the concave surface 19 concurrently disengages with the beveled portions 26 on segments 20. As the operating pin proceeds in a forward direction, it thus positively presses the plunger segments outwardly to the point at which the under surfaces 25 of shoulders 22 engage the surface surrounding the periphery of the aperture in part 5.

This extended position of the operating pin 13 is shown in FIGURE 4. At this point, the latch is completely engaged and the closure is united with the aircraft structure. It should be noted from FIGURE 4 that in this position, the plunger segments are wedged outwardly by the large cylindrical portion of pin 13. In this outwardly wedged condition the outer surfaces of the plunger segments themselves form a cylinder which singly fills the cylindrical apertures in the parts 4 and 5 that are being united.

This gives a continual abutting relationship of structural material across the entire latch area that completely encloses the apertures in both the periphery of the closure member and the periphery of the aperture in the aircraft structure. This relationship provides the increased rigidity and strength of the latch of the present invention and insures that the closure acts as a unitary part of the aircraft structure when the latch is engaged.

It should also be noted that the spring member 29 is not an active part of the latch in the sense of actuation. It merely serves the purpose of urging the plunger segments 20 toward their appropriate positions at all times. The latch cannot be opened by overcoming the pressure exerted by spring 29, but can only be opened by a positive rearward actuation of the operating pin 13.

To open the latch, the handle means or actuating means associated with pin 13 is employed to produce rearward motion of operating pin 13. As the pin retracts, the concave surface 19 under head 17 of the operating pin engages the beveled portions 26 of plunger segments 20 and the plunger segments are urged inwardly until the beveled surface 26 is in a nested relationship with concave surface 19 and the indentions 23 of the plunger segments 20 coincide with portion 14 on the operating pin 13. The entire operating pin plunger assembly is then in a slidable relationship with the aligned apertures of the aircraft structure and the closure, and the assembly can be withdrawn into the housing 8 to release the closure from the aircraft structure.

Figure 7:
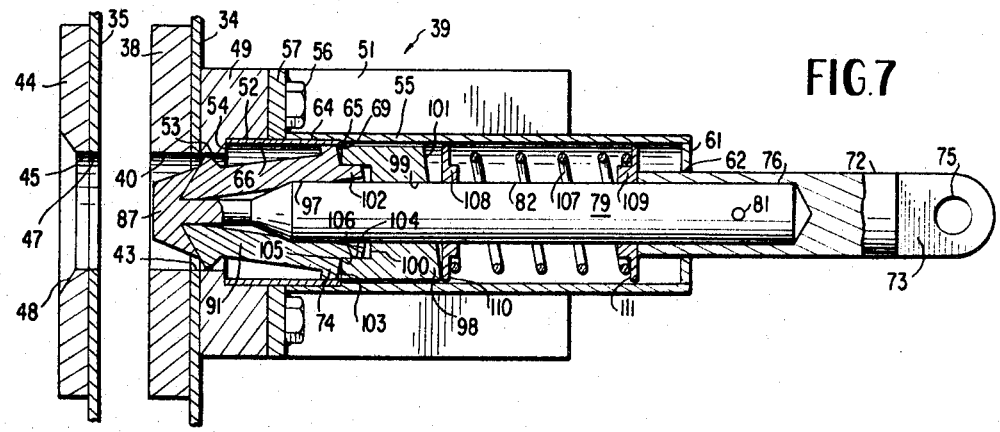
FIGURE 7 is a horizontal sectional view of a modification of the latch of this invention showing it in its retracted position.
Figure 8:
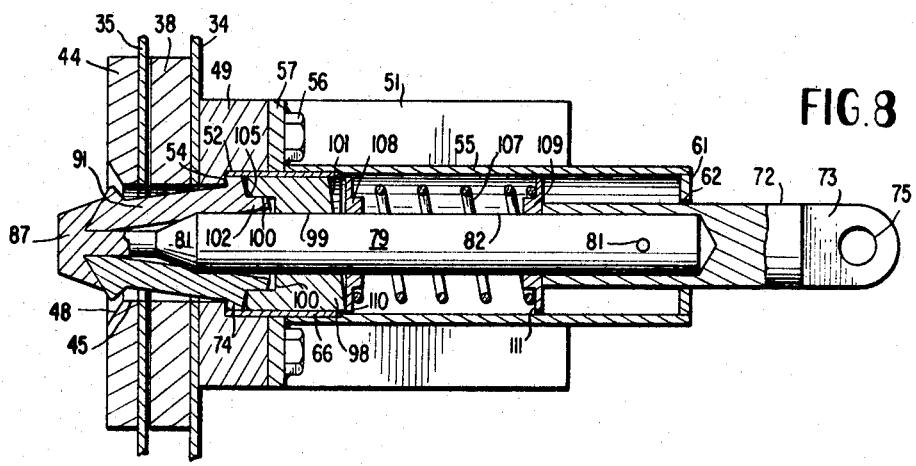
FIGURE 8 is a horizontal sectional view of the latch modification showing it in an intermediate state ready for extension and engagement.
Figure 9:
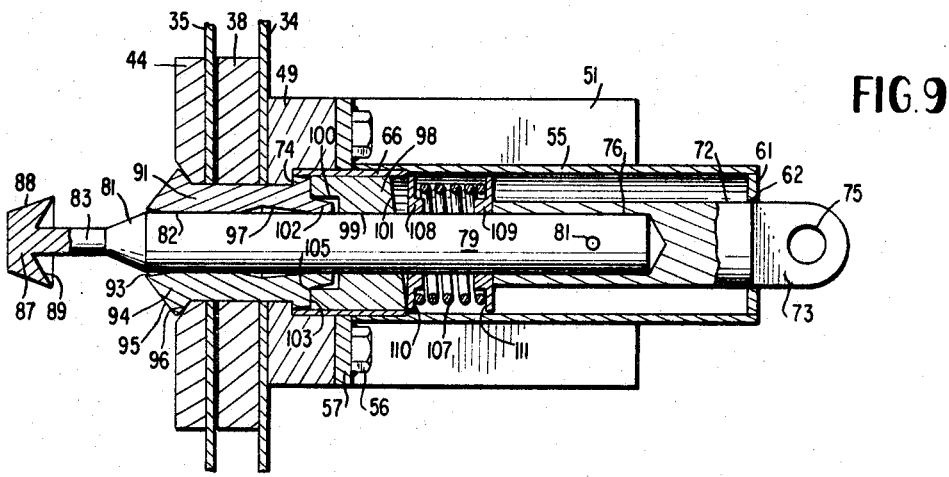
FIGURE 9 is a horizontal sectional view of the latch modification showing it in its operated or engaged position.

FIGURES 7, 8 and 9 show a second embodiment of the proposed aircraft latch assembly. Since the latch can be mounted to either the closure or the structure surrounding it, either part 34 or part 35 can be the closure with the other part being part of the aircraft structure surrounding the opening. A plate 38 reinforces the structure upon which the latch receptacle 39 is mounted. A round aperture 40 in plate 38 is in alignment with an aperture 43 of the same size in part 34.

A plate 44 reinforces the structure opposite the latch. The plate has a circular opening 45 the same size as and in alignment with an opening 47 in part 35. These openings have the same diameter as the openings in part 34 and plate 38. Opening 45 is shown provided with a beveled counterbore 48.

The receptacle 39 includes a portion 49 suitably connected to part 34. Opposite side portions 51 extend from portion 49 so that the receptacle has a generally U-shaped configuration. Connecting portion 49 has a circular aperture 53 of the same size as the openings in plate 38 and part 34. The aperture is counterbored to form an enlarged diameter bore 52 in sequential alignment with aperture 53. The juncture between aperture 53 and enlarged diameter bore 52 forms a shoulder 54.

A tubular housing 55 is fastened to portion 49 of receptacle 39 in axial alignment with apertures 40 and 43 by suitable fastening means such as bolts 56 engaging with a flange 57 at the foremost end of housing 55. The housing also includes a rear wall 61 with an aperture 62 therein. The openings and apertures in the housing and receptacle are in axial alignment with the openings in parts 34 and 35. The foremost portion of housing 55 has its internal diameter enlarged at 64 to the same diameter as the enlarged diameter bore 52 with a shoulder 65 at rear end of enlarged internal diameter 64.

A length of enlarged diameter is thus defined between shoulder 54 in member 49 and shoulder 65 in housing 55. A tubular member 66 is mounted in the above defined area. The wall of the tubular member 66 is of a sufficient thickness to extend inwardly of the inner surface of housing 55 to form a ledge 69. At the same time a substantial portion of shoulder 54 remains exposed.

A latch operator 72 is slidably received in aperture 62 of housing 55. It is of cylindrical cross section and has an end portion 73 with an opening 75 to receive a suitable handle means (not shown). The cylindrical portion of the latch operator is bored at 76 to receive operating pin 79. The operating pin is connected to the latch operator by pin 81.

As best seen in FIGURE 9 the operating pin 79 has a conically tapered portion 81 intermediate a cylindrical section 82 received in the latch operator bore 76, and a reduced diameter section 83. Forwardly, of the reduced diameter section 83 the operating pin 79 has a terminal head portion 87 with a beveled forward surface 88 and a conically concave rearward surface 89, the purpose of which will be hereinafter described.

A plurality of plunger segments 91 surrounds the operating pin. The plunger segments are restrained from passing through apertures 43 and 40 by outwardly extending flanges 74 at the rear of each plunger segment. The front of each plunger segment terminates in an enlarged shoulder portion 94. The forward end of the enlarged shoulder portion 94 has a beveled outer end surface 95 to nest in the conically concave rearward surface 89 of the operating pin before it is fully extended as in FIGURES 7 and 8. Enlarged shoulder portion 94 has a tapered inner surface 93. The surface adjoining outer end surface 95 is beveled at 96 to engage the beveled counter-bore 48 of opening 45 when the operating pin is in its foremost position as shown in FIGURE 9.

Plunger segments 91 have indentations 97 substantially identical to indentations 23 on segments 20 illustrated in FIGURE 3.

A cylindrical retainer 98 (FIGURE 7) with an axial bore 99 slidably receives cylindrical portion 82 of the operating pin 79. At the forward part of the retainer the bore is enlarged to form a recess 100. Edge 105, formed by the front wall of the retainer and the side wall of the recess is spaced from the operating pin. The rear wall of the retainer is beveled to provide a bearing surface 101 in nonperpendicular relationship to the longitudinal axis of retainer 98.

Legs 102 depending from flanges 74 of the plunger segments are received within the recess 100. The juncture of the rear wall 103 of the flange and outer surface 104 of leg 102 forms a notch 106 in pivotal contact with edge 105. Edge 105 and the notch 106 serve as a pivot joint for the plunger segments as they rotate outwardly to engage part 35 and plate 44 after they reach their fully extended position.

A partially compressed coil spring 107 surrounding the operating pin is supported at its ends by discs 108 and 109, respectively. The discs are slidably mounted on the cylindrical portion 82 of operating pin 79. Each disc has a reduced outer portion 110 and 111 forming a seat for the ends of the spring. Since the spring is slightly compressed in FIGURE 7 it tends to urge the discs apart so that the rear wall of disc 109 bears against the foremost end of the latch operator 72 while disc 108 is in contact with the retainer 98.

The latch assembly shown in FIGURES 7, 8 and 9 operates in a manner similar to the operation of the latch shown in FIGURES 4, 5 and 6 but the added retainer 98, spring biased discs 108 and 109, etc. insure that proper sequential movement of the parts occurs in opening and closing the latch.

The cylindrical retainer 98 works in conjunction with disc 108 to sequence the expansion of the plunger segments 91 in such a way that no expansion of the segments can occur until the segments are fully extended to the position shown in FIGURE 8. FIGURE 8 shows the latch assembly in an intermediate position comparable to that of the latch embodiment as shown in FIGURE 5. The operating pin has thus been moved to the left until the plunger segments extend fully through the part 35 and plate 44. The retainer 98 has moved into tubular member 66. It is important to note that the relative positions of the segments 91, retainer 96 and disc 108 and 109 have not changed with respect to the operating pin from their positions shown in FIGURE 7.

The sequencing operation in this latch embodiment may best be described by reference to FIGURES 7, 8 and 9. When the operating pin is fully withdrawn, the spring 107 pushes disc 108 against the beveled bearing surface 101 on retainer 98. The retainer, in turn, pushes against the four plunger segments 91, urging them against the conically concave rearward surface 89 of the terminal head portion 87 on operating pin 79. This assures that the plunger segments 91 will be retained in their fully contracted position as shown in FIGURE 7. When so contracted, the possibility of the plunger segments rubbing on the sides of the apertures in the parts and plates through which they pass is prevented. Thus, the plunger segments cannot begin to expand before they have fully passed through the apertures in these members. Should the plunger segments begin to expand in the apertures the latch could become locked at a position where it could not be fully actuated to fasten the closure.

The pressure of spring 107 against disc 108 urges the disc against the beveled surface 101 on retainer 98 causing the disc to cock on the operating pin 79 such that it locks in position. This prevents the operating pin from sliding forward to release and expand the plunger segments 91.

To free the disc 108 from its cocked position and concurrently release operating pin 79 to move forward and expand the plunger segments 91, the operating pin and parts carried thereby are shifted to the position shown in FIGURE 8. As retainer 98 moves to be entirely within the tubular member 66, the disc 108 engages with ledge 69 at the end of tubular member 66. This ledge lies in a plane perpendicular to the axis of operating pin 79. Thus disc 108 is freed from its cocked position wherein it locks the operating pin 79 and placed in a position perpendicular to the operating pin axis where the pin is free to slide through the disc 108. This pin movement consequently releases and thereafter expands the plunger segments 91 into the fully locked position for the latch as shown in FIGURE 9.

It will be noted that by reason of the cooperating beveled counterbore 48 on plate 44 and the beveled surface 96 on the plunger segments 91, the two parts being latched together may effectively be drawn in to closer reationship with each other as the latch is operated to the position shown in FIGURE 9.

It should be understood that the above description of the present invention is only of the preferred embodiments and that modifications thereof may be made without departing from the spirit of my invention and that my invention should be restricted only in accordance with the following appended claims.

What is claimed is:

1. A latch for uniting a closure component to the structural component containing the opening to be closed by said closure comprising:

a housing to be mounted on one of the components to be united, and having an aperture to be aligned with the apertures of the components through which the latch plunger is to extend, an operating pin slidable within said housing and having an enlarged head to project through the aligned component apertures when said latch is engaged, said head having a conically concave rearward surface, said pin being formed rearwardly of said head with a reduced diameter section, and a conical section merging into an enlarged diameter section, a plurality of plunger segments within said housing spaced circumferentially around said pin and axially slidable within said housing, each segment having a forward beveled portion to engage with the conically concave surface on said head and a rearwardly facing shoulder at its forward end to engage with the other of the components to be united and a flange at its rearward end, each segment having an inner wall portion to mate with the exterior of said pin, said wall portion including a recess to nestingly engage with the juncture of said conical section and enlarged diameter section on said pin, and spring means biasing said segments forwardly relative to said housing, axial movement of said pin in a forward direction moving said juncture of said conical section and said enlarged diameter section on said pin out of the recess in the inner wall portions of said segments to cause said segments to expand radially outwardly into the aligned apertures of the components to be united, with the shoulder and flange on each segment respectively engaging the components to retain the components united, axial movement of said pin in a rearward direction causing said conically concave surface to engage the forward beveled portion on each plunger segment to cam said segments radially inwardly and retract them into said housing with the operating pin.

2. An improved latch for uniting a closure member with a structure member encircling the opening to be closed by said closure member to provide uninterrupted shear, compression and tensile strength between the structure member and the closure member comprising:

a housing to be mounted to one of the members to be united, said housing having an aperture at each end, an operating pin slidably positioned within said housing and extending out of said housing at each end, said operating pin having an enlarged head at its forward end preceded in succession by a reduced diameter section, conical section and an enlarged diameter section, said head being conically concave on its underside, a plurality of plunger segments positioned within said housing around the periphery of said operating pin and axially slidable within said housing, said plunger segments each having a flange at its rearward end within said housing, the forward end of each plunger segment terminating in an outwardly extending shoulder, said shoulder being beveled on its forward side to accommodate the conically concave underside of the operating pin head, said plunger segments having an inner side wall providing a recess to accommodate the juncture of said conical section and said enlarged diameter section on said pin; said operating pin upon forward movement shifting said juncture of said conical section and said enlarged diameter section on said pin out of the recess in the inner wall portions of said segments to urge said plunger segments radially outwardly to a point where said shoulders of the plunger segments engage to hold the other member to be united and said flange members hold the member mounting said housing, and said operating pin upon rearward movement engaging said conically concave underside of said head with the beveled forward side of said segments to urge said plunger segments radially inwardly whereby they retract into said housing with the operating pin; and a spring positioned within said housing connected to urge said segments forwardly relative to said housing.

3. A latch for securing an aircraft closure member to an aircraft structure member comprising:

a housing to be mounted on one of the members to be connected by said latch;

an operating pin slidably positioned in said housing and extending therefrom, said pin having a reduced diameter section merging into a rearward conical section, said conical section merging into an enlarged diameter section;

a spring within said housing and surrounding a portion of the length of said operating pin;

a plurality of plunger segments positioned circumferentially of the periphery of the operating pin and axially slidable within said housing, said spring urging said segments forwardly, each plunger segment having an outwardly projecting flange within the housing and an outwardly projecting shoulder at its forward end, the portion of each segment adjacent the operating pin having a longitudinally recessed portion including an indented cam surface intermediate the ends thereof to accommodate the operating pin, cam surfaces on said operating pin including the juncture of said conical section and said enlarged diameter section engageable with the recessed portion and indented cam surfaces of said segments;

said operating pin upon forward movement shifting said juncture forwardly relative to said recessed portion and indented cam surfaces of said segments to urge said segments radially outwardly until said outwardly projecting shoulders engage the other of said members and said flanges engage said housing and rearward movement of the operating pin shifting said juncture rearwardly relative to said recessed portion of said segments to release said shoulders from said other member with said segments movable radially inwardly as the plunger segments retract with the operating pin.

4. A latch as defined in claim 3 and further including retainer means interposed between said spring and said segments;

said retainer means including a first retainer member with forward and rear walls slidably mounted on said pin in said housing, said rear wall being beveled to provide a surface in non-perpendicular relation to the axis of said pin;

a second retainer member slidably mounted on said pin in said housing, said second retainer member being adjacent said first retainer means to be urged into engagement with said beveled rear wall by said spring whereupon said second retainer member locks in place on said pin; and means associated with said housing engageable with said second retainer member to free it from its locked position on said pin and free said pin for complete actuation of said latch.

5. A latch as defined in claim 4 wherein said last named means includes a portion of said housing having a reduced section forming a ledge;

said first retainer member being slidably received within said reduced section; and said second retainer member being of greater dimension than said section so that forward movement of said second member is limited by said ledge.

6. A latch for an aircraft closure comprising:

a housing;

an operating pin slidably positioned within the housing;

a plurality of plunger segments positioned circumferentially of the operating pin and axially slidable within said housing, each of the plunger segments having a shoulder at the forward end thereof and an outwardly projecting flange at the rearward end thereof, cam surface means on said pin and segments, said plunger segments being urged radially outwardly and radially inwardly by cooperative engagement of said cam surface means upon axial movement of said operating pin;

means for preventing said radial outward movement until said segments are fully extended to be expanded to latch the closure comprising first and second retainer members;

said first retainer member having forward and rear walls and being slidably received in said pin, said rear wall being beveled to provide a surface in non-perpendicular relation to the axis of said pin;

said second retainer member being slidably received on said operating pin;

biasing means in said housing urging said second retaining member forwardly toward the beveled rear wall of said first retaining member whereupon said second retaining member locks in place on said pin; and means associated with said housing engageable with said second retainer member to free it from its locked position on said pin and free said pin for complete actuation of said latch.

7. A latch as in claim 6 wherein said last named means includes a portion of said housing having a reduced cross section, said portion forming a ledge in said housing;

said first retaining member being slidably receivable within said reduced cross section portion;

said second retaining member having a cross section larger than said reduced cross section so that forward movement of said second retainer is limited by said ledge.

References Cited
UNITED STATES PATENTS

| | | | |
|---|---|---|---|
| 2,276,344 | 3/1942 | Rogers | 85—81 |
| 3,026,761 | 3/1962 | Torresen | 85—84 |
| 3,158,059 | 11/1964 | Myers | 85—81 X |

MARVIN A. CHAMPION, *Primary Examiner.*

JOHN R. MOSES, *Assistant Examiner.*